too_long by the inclusion of the substituents. For example, a free carboxyl group may be introduced into 4-amino-pyrazolones in the 3-position for increasing the solubility in alkali without it being necessary to accept a lowering of the developing power, whereas the developing power of p-phenylene diamine derivatives is in most cases strongly reduced by nuclear substitution with carboxyl groups. The developing substances may also be incorporated into silver halide emulsion layers. These are developed by means of an alkaline solution, whereby the colour couplers are either added to their solution or to the emulsion layer.

EXAMPLE 1

A photographic silver bromide emulsion, to which 4 - stearoyl - amino - benzoyl - acetanilide - 3',5' - dicarboxylic acid is added as a diffusion-resisting color former is exposed and developed in a developer of the following composition:

| | |
|---|---|
| Potash | gm 75 |
| Sulphite | gm 10 |
| Potassium bromide | gm 2.5 |
| Ethane - sulpho - hydrazide of 1 - phenyl - 4 - amino - pyrazolone - 3 - carboxylic acid hydrochloride | gm 7 |
| Water | cc 1000 |

The material is rinsed, bleached and fixed in the usual manner, and there is thus obtained an intensive yellow dye image.

The methane-sulfo-hydrazide of 1-phenyl-4-aminopyrazolone-3-carboxylic acid hydrochloride is obtained as follows:

23.2 g. of 3-carbethoxy-1-phenyl-pyrazolone (90%) are heated to 70° C. with 12 cc. of alcohol, 12 cc. of hydrazine hydrate (80%) are added, the mixture is heated to boiling temperature for 5 hours and stirred into 10 cc. of concentrated HCl and 40 g. of ice, filtered with suction, the filtered substance washed with water, stirred with 100 cc. of water, filtered with suction and the filtered product dried. M.P.: 252–254° C.

10.9 g. of the pyrazolone obtained are dissolved in 42.5 cc. of NaOH (5%), 6.3 g. of methane sulfochloride added in drops at 15–20° C. and the solution is kept alkaline by the addition of NaOH (10%), (alkalinity is determined by means of phenol phthalein) stirred for one hour, filtered and the filtrate precipitated with hydrochloric acid (10%) and filtered with suction. The wet product is dissolved in 50 cc. of NaOH (10%), 3.5 g. of NaNO$_2$ are added and the mixture is added dropwise to 50 cc. of concentrated HCl and 75 g. of ice at 5–10° C., filtered with suction, stirred with methanol (50%) and filtered with suction once more. The resulting isonitroso compound is reduced in a manner analogous to the directions in Arch. Pharm., 278 (1940), 330.

EXAMPLE 2

If p - octadecenyl - succinamino - benzoyl - acetonenitrile is used as color former and 3-phenyl-4-aminoisoxazolone-hydrochloride is used as color-developing substance in accordance with the process according to Example 1, an intensively lemon-yellow dye image is obtained.

The 3 - phenyl - 4 - amino - isoxazolone - hydrochloride is obtained as follows:

3-phenyl-isoxazolone-5 prepared as described in "Berichte der Deutschen Chemischen Gesellschaft," 24 (1891), 502, is treated with nitrous acid according to Berichte, 24, (1891), 142, and reduced as follows:

19 g. of the nitroso compound are reacted in 20 cc. of alcohol and 120 cc. of concentrated HCl at 10–15° C. in portions with tin sponge in a total amount of 24 g., stirred until decolorized, filtered with suction, the filtered substance dissolved in little cold water and precipitated with concentrated HCl.

If the above-said color coupler is replaced by 5-octadecenyl-succinaminoindazolone a magenta image is obtained.

EXAMPLE 3

If the color former indicated in Example 1 is replaced by a pyrazolone, for example by 1-(4'-phenoxy-3'-sulphophenyl)-3-heptadecyl-parazolone-5, and if the color-developing substance is replaced by the hydrochloride of 1-phenyl-3-carbethoxy-4-amino-pyrazolone-5, a brilliant magenta image having high blue transmission is obtained (abs. max. 560 m$\mu$).

The 1 - phenyl - 3 - carbethoxy - 4 - amino - pyrazolone-5 can be obtained according to Arch. Pharm., 278 (1940), 330.

EXAMPLE 4

1 - (2',4' - disulphophenyl) - 3 - (m' - stearoylaminophenyl)-pyrazolone is used in place of the color former mentioned in Example 1, and the hydrochloride of 1-phenyl-4-amino-pyrazolone-3-carboxylic acid amide is used as developer. A magenta image having high blue transmission is obtained.

The 1 - phenyl - 4 - aminopyrazolone - (5) - 3 - carboxylic acid amide is obtained as follows:

20 g. of 1-phenyl-3-carbethoxypyrazolone-(5) are heated with 40 g. of aqueous NH$_3$ solution (25%) in the autoclave to 100° C. for 6 hours, part of the excess ammonia is removed by releasing pressure and the content of the autoclave is acidified with concentrated HCl after cooling, filtered with suction and the paste obtained is used directly for treatment with nitrous acid.

42 g. of the paste containing 1-phenyl-3-carbonamide pyrazolone-5 (21.8%) are dissolved in 27.5 cc. of NaOH (10%), 3.2 g. of sodium nitrite are added and the whole is stirred into a mixture of 30 cc. of concentrated HCl and 30 g. of ice at 0° C., filtered with suction and the filtered substance washed with about 50 cc. of methanol.

10 g. of the isonitroso compound obtained are dissolved in 100 cc. of glacial acetic acid of 40° C., zinc dust is introduced in portions and the solution stirred until decolorized, filtered and hydrogen chloride introduced until precipitation of the hydrochloride is complete, the mixture is filtered with suction and the filtered substance washed with little alcohol.

EXAMPLE 5

1-naphthol-2-carboxylic acid-(N-octadecyl-N-3',5'-dicarboxyanilide) is added to the emulsion instead of the color former according to Example 1, while the hydrochloride of 1-phenyl-4-aminopyrazolone-3-carboxylic acid hydrazide is used as color developer. A brilliant blue-green image is obtained.

The 1-phenyl-3-carboxylic acid hydrazide-4-aminopyrazolone-5 is obtained as follows:

13 g. of the nitroso compound of Example 3 are mixed with stirring with 26 g. of hydrazine hydrate (80%) at 20° C. for 6 hours, stirred with 100 cc. of methanol and filtered with suction. The isonitroso carboxylic acid hydrazide obtained is reduced as described in Example 3.

EXAMPLE 6

A photographic silver halide emulsion layer containing the color coupler of Example 3 is developed in a color developer of the following formula:

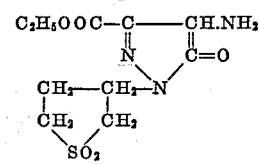

The color former is obtained as follows:

31.5 g. of an aqueous hydrazine hydrate solution (35%) is reacted with 16 g. of butadiene sulfone and kept at 75° C. for 30 hours. The major quantity of the water is subsequently removed in vacuum.

15 g. of the resulting sirupy hydrazine are heated with 21 g. of sodium oxalate, 50 cc. of alcohol (50%) and 6.6 cc. of glacial acetic acid to 65° C. for 5 hours, the alcohol is distilled off under reduced pressure, the residue suspended with hydrochloric acid (3%), filtered with suction and the filtered substance recrystallized from dilute acetic acid.

27 g. of the pyrazolone are dissolved in an appropriate quantity of NaOH (5%), 7 g. of sodium nitrite are added and the mixture is added with stirring to 350 cc. of hydrochloric acid (10%) while cooling with ice, filtered with suction and the filter cake substance dried.

12 g. of the nitroso compound are reduced in 12 cc. of alcohol and 48 cc. of concentrated HCl with 4.6 g. of tin sponge, the filtered solution is neutralized with sodium acetate and the precipitate filtered with suction.

By subjecting the above photographic layer to color development by means of this developer a magenta image having the maximum at 550 m$\mu$ is obtained.

EXAMPLE 7

A photographic silver halide emulsion layer is exposed and developed in a developer of the following composition:

|  | G. |
|---|---|
| Potash | 75 |
| Sodium-sulfite anhyd. | 10 |
| Potassium bromide | 2.5 |
| $\beta$-Naphthol | 2 |
| 4-amino-5-pyrazolone-3-carboxylic acid amide hydrochloride | 5.5 |

After bleaching and fixing an orange-red dye image is obtained.

If the developer contains $\beta$-naphthol-5-, or -6-, or -7-sulfonic acid, a green dyestuff image is obtained.

EXAMPLE 8

If 3-cyanoacetylamino-4-N-methyl-N-octadecylaminobenzoic acid is used as color coupler in a photographic silver halide emulsion layer and 1-(p'-aminophenyl)-3-carbethoxy-4-aminopyrazolone-5 is used as color developing substance an intensive yellow image is obtained.

The 1-p'-aminophenyl-3-carbethoxy-4-aminopyrazolone-5 is obtained from 42 g. of sodium oxalate, 38 g. of p-nitrophenyl-hydrazine-hydrochloride and 250 cc. of alcohol (50%); the mixture is stirred at 60–70° C. for 3 hours, filtered with suction after cooling, washed with methanol (50%) and recrystallized from dilute alcohol.

27 g. of the pyrazolone obtained are dissolved in 150 cc. of NaOH (5%), 7.2 g. of sodium nitrite added and dropped at 5–10° C. into 100 cc. of concentrated hydrochloric acid and 100 g. of ice, the mixture is stirred for one hour, filtered with suction and the filtered substance washed with water until acid-free.

Reduction is carried out by suspending 30.5 g. of the isonitroso compound with 50 cc. of alcohol and 300 cc. of concentrated HCl, adding in potrions 60 g. of tin sponge, stirring for 24 hours, filtering with suction, dissolving the filtered substance in little water and precipitating the product with concentrated HCl.

EXAMPLE 9

A photographic silver halide emulsion layer containing the color coupler of Example 3 is exposed and developed in a developer of the following composition:

| $K_2CO_3$ | g | 75 |
|---|---|---|
| $Na_2SO_3$ | g | 5 |
| Hydroxylaminosulfate | g | 2 |
| Potassium bromide | g | 2 |
| 1 - (2' - benzthiazolyl) - 3-methyl-4-aminopyrazolone-(5)chlorohydrate | g | 3.5 |
| P-Diethylaminoaniline-sulfate | g | 2.5 |
| Water up to | cc | 1000 |

A yellow dye image having the maximum at 450 m$\mu$ is obtained. The 1-(2'-benzthiazolyl)-3-methyl-4-aminopyrazolone is prepared as follows:

0.2 mol of hydrazine hydrate is dissolved in 30 cc. of alcohol, 0.1 mol of 2-chlorobenzthiazole added in drops with stirring at 40–50° C., the solution is filtered with suction after cooling and the filtered substance washed with little methanol. 0.1 mol of the hydrazine is heated to boiling temperature for 2 hours with 0.11 mol of acetoacetic ester and 20 cc. of toluene, the mixture filtered with suction after cooling and the filtered substance washed with toluene.

10 g. of the pyrazolone are dissolved in 250 cc. of dimethyl formamide, 15 cc. of water and 10 cc. of NaOH (10%), a solution of 3.2 g. of sodium nitrite in 5 cc. of water is added and the mixture introduced into 300 cc. of glacial acetic acid with stirring at 0° C. The precipitating yellow substance is filtered with suction and reduced as described in Example 3.

EXAMPLE 10

A photographic silver halide emulsion layer containing a color coupler obtained by condensation of 0.15 mol of acetone dicarboxylic acid ester and 0.1 mol of 2-(N-methyl-N-octadecylamino)-phenylhydrazine - 5 - carboxylic acid in 100 cc. of pyridine and precipitation with hydrochloric acid, is developed with 3-carbethoxy-4-aminopyrazolone-5 as described in Example 3.

The 3-carbethoxy-4-aminopyrazolone-(5) is prepared as follows:

15 g. of sodium acetate, 79 g. of sodium oxalate (96%) and 63 g. of hydrazine sulfate in 300 cc. of water are heated to boiling temperature while stirring for 6 hours, stirred in the cold overnight, filtered with suction and the filtered substance washed with little water and methanol.

43 g. of the pyrazolone are dissolved at 15° C. in 100 cc. of HCl (1:1), separated from the undissolved portion, and 17 g. of sodium nitrite in 30 cc. of water are added in drops to the solution at 10–15° C., the precipitating substance is filtered with suction, washed with water and dried.

30 g. of the isonitroso compound obtained are hydrogenated in 100 cc. of methanol and 2 g. of Raney nickel at 100 atmospheres and 50° C., the catalyst is separated off by filtering in the heat, and the filtrate is mixed with excess concentrated HCl, filtered with suction and the precipitating substance washed with alcohol and ether (1:1).

EXAMPLE 11

A color coupler, which is obtained as described below, is added to a photographic silver halide emulsion layer:

11 g. of 1-(4'-phenoxy-3'-sulfophenyl)-3-aminopyrazolone-5 (see Konishiroku Review, vol. 5 (1954), No. 2, pages 34–41) are heated to 110° C. for 5 hours with 8 g. of lauroyl acetate and 20 cc. of pyridine, introduced after cooling into 100 cc. of HCl (10%) while stirring, the mixture is filtered with suction, the precipitated substance dried and washed with little acetone.

By developing the photographic layer with a color developer of the formula: 1-phenyl-4-aminopyrazolone-3-(N-$\beta$-hydroxyethyl)-carboxylic acid amide in the usual manner, a blue-green dye image is obtained.

The 1-phenyl - 3 - (N-$\beta$-hydroxyethylcarbonamide)-4-amino-pyrazolone-5 is obtained as follows:

26 g. of 1-phenyl-3-carbethoxypyrazolone-5 (90%), 10 cc. of ethanolamine, and 5 cc. of water are heated to 110° C. for 5 hours, diluted with water and introduced with stirring into hydrochloric acid (10%), filtered with suction and the precipitated substance is recrystallized from methanol (50%).

The product can be treated with nitrous acid and reduced according to any of the herein described methods.

EXAMPLE 12

If 3-stearoylamino-$\alpha$-naphthol-6-sulfonic acid is used as diffusion resistant color coupler and the color developer of Example 11, a blue-green dye image with a maximum at 650 mμ is obtained.

EXAMPLE 13

An exposed photographic silver halide emulsion layer containing the color coupler of Example 3 as color developing substance, is developed with 1-phenyl-3-(p-aminophenyl)-4-aminopyrazolone-5. A magenta image is obtained.

The 1-phenyl - 3 - (p-aminophenyl)-4-aminopyrazolone-5 is prepared as follows:

0.05 mol of p-nitrobenzoylacetic ester is heated for two hours in 10 cc. of glacial acetic acid and 10 cc. of water with 0.06 mol of oxalate, filtered with suction after cooling and the precipitating substance recrystallized from alcohol.

0.05 mol of the nitro compound is dissolved in an appropriate amount of dimethyl formamide, ten times the quantity of glacial acetic acid added and the calculated quantity of finely pulverized sodium nitrite added in portions with stirring, the mixture stirred for 5 hours, filtered with suction and the resulting nitroisonitroso compound is produced as described in Example 4.

The following table sets out color shades obtained with various color developers and color couplers of the invention. In the table, the letters A–M refer to color couplers and the numerals I–X to color developers which are identified on the pages following the table. The numbers cited in connection with the color shades are the absorption maxima in mμ.

(D) 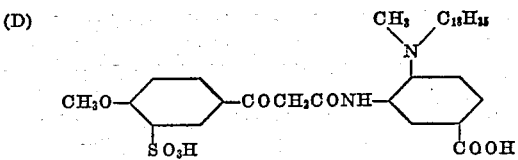

(E) 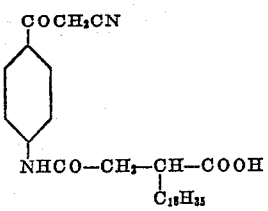

(F) 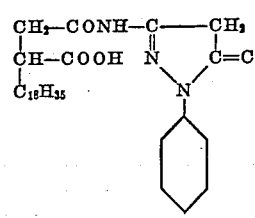

Table

|   | A | B | C | D | E | F |
|---|---|---|---|---|---|---|
| I | red | maroon | yellow | | Carmine red | red 500. |
| II | do | | yellow 450 mμ | | orange 475 | brick red. |
| III | do | brown | orange yellow | | orange 465 | red. |
| IV | | | | | | |
| V | red | orange | yellow | | orange | orange 495. |
| VI | yellow red | brown yellow | do | orange yellow 470 | orange 490 | red. |
| VII | orange | do | do | | carmine red | orange. |
| VIII | yellow | yellow | do | | orange red | orange 440. |
| IX | do | do | do | | carmine red | |
| X | orange 550 | yellow 440 | yellow 435 | | | red 539. |

|   | G | H | I | J | K | L | M |
|---|---|---|---|---|---|---|---|
| I | purple 565 | purple | | blue 585 | blue 590 | blue-green 650 | blue-green 640. |
| II | purple 555 | purple 550 | | blue 595 | blue 585 | blue-green 645 | blue-green. |
| III | do | do | | blue 600 | do | blue-green 650 | Do. |
| IV | purple 550 | | | | | | blue-green 640. |
| V | purple 555 | purple | | blue 600 | blue 590 | green | green. |
| VI | purple 550 | do | | blue 575 | blue 585 | blue-green | blue-green. |
| VII | yellow orange | do | | blue 590 | blue 595 | do | Do. |
| VIII | yellow 450 | red | | blue | violet | do | Do. |
| IX | red | purple | purple | blue 575 | do | do | Do. |
| X | purple 545 | purple 550 | | | violet 570 | | |

In the above table the letters A–M relate to the following components:

(A) 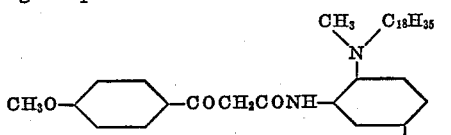

(G) 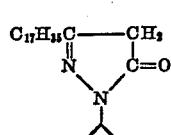

(B) 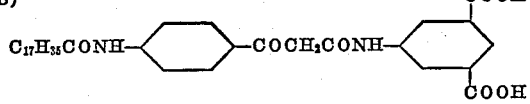

(C) 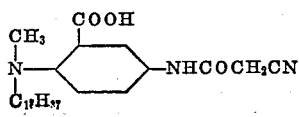

(H) 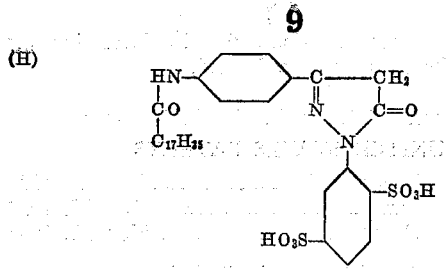

(I) 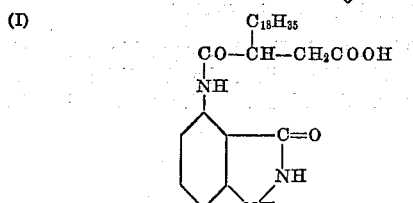

(J) 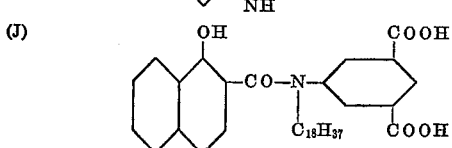

(K) 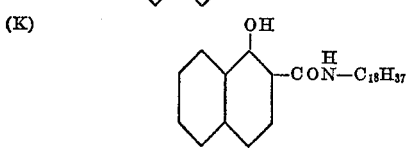

(L) Solution according to Example 11

(M) 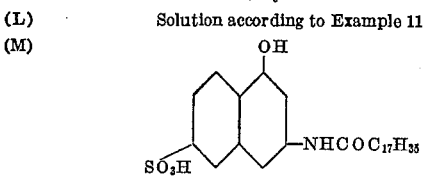

The numerals I–X refer to the following color forming developing substances:

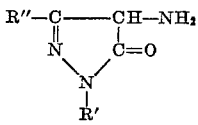

(I)     $R'=C_6H_5$
        $R''=COOC_2H_5$ (II)    $R'=C_6H_5$
        $R''=CONH_2$ (III)   $R'=C_6H_5$
        $R''=CON_3$ (IV) 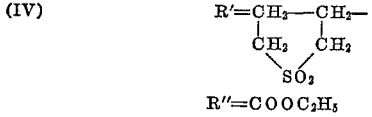
        $R''=COOC_2H_5$ (V)    $R'=C_6H_5$
        $R''=CONHNHSO_2CH_3$ (VI)   $R'=H$
        $R''=COOC_2H_5$ (VII) $R'=p-HO_3S.C_6H_4$
        $R''=COOC_2H_5$ (VIII) 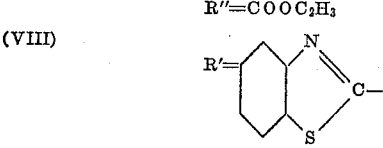
        $R''=CH_3$ (IX) 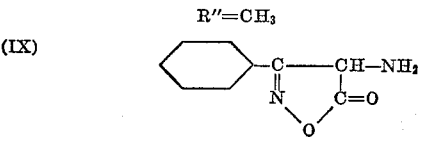

(X) 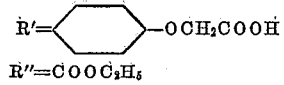
        $R''=COOC_2H_5$

What we claim is:

1. In the process of producing photographic color images by developing an exposed silver halide emulsion with a color forming developer in an alkali-containing bath and in the presence of a color coupler containing a coupling radical selected from the class consisting of reactive methylene and hydroxy aryl groups, which coupler reacts with the oxidation products of the developer to produce stable dyes that form in the portions of the emulsion where development takes place and remain in those portions to give a dye image corresponding to the exposure, the improvement by which the developer is selected from the class consisting of

and

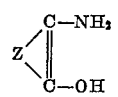

where Z represents a group that completes a heterocyclic ring selected from the class consisting of pyrazolone-5 and isoxazolone rings, thereby increasing the stability of the dyes that are formed.

2. The combination of claim 1, wherein the heterocyclic ring is substituted by a radical selected from the group consisting of alkyl, aryl, acyl, alkoxy, carboxyl, carbalkoxy, amino and hydroxyl radicals.

3. An alkali-containing photographic silver halide developing solution of a color forming developing substance corresponding to a formula selected from the group consisting of

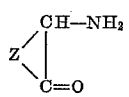

and

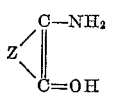

wherein Z represents atoms necessary for completing a heterocyclic ring selected from the group consisting of pyrazolone-5 and isoxazolone rings, said solution also containing a color coupler that has a coupling radical selected from the class consisting of reactive methylene and hydroxy aryl groups, said coupler being capable of reacting with the oxidation products of said developing substance to form dyes with improved stability.

4. A photographic silver halide developing solution according to claim 3, wherein the heterocyclic ring is substituted by a radical selected from the group consisting of alkyl, aryl, acyl, alkoxy, carboxyl, carbalkoxy, amino and hydroxyl radicals.

5. In the process of producing photographic color images by developing an exposed silver halide emulsion with a color forming developer in an alkali-containing bath and in the presence of a color coupler having the diffusion-resistant structure of an alkyl chain containing at least 12 carbons, which coupler reacts with the oxidation products of the developer to produce stable dyes that form in the portions of the emulsion where development takes place and remain in those portions to give a dye image corresponding to the exposure, the improvement by which the developer is selected from the class consisting of

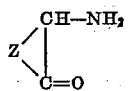

and

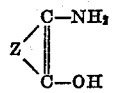

where Z represents a group that completes a heterocyclic ring selected from the class consisting of pyrazolone-5 and isoxazolone rings, thereby increasing the stability of the dyes that are formed.

References Cited in the file of this patent
UNITED STATES PATENTS

| | | |
|---|---|---|
| 2,163,781 | Eggert et al. | June 27, 1939 |
| 2,698,244 | Land | Dec. 28, 1954 |
| 2,704,711 | Hanson | Mar. 22, 1955 |

OTHER REFERENCES

Mees: "The Theory of The Photographic Process," pages 584–598. The MacMillan Co. Publishers, New York (1954), revised edition. (Copy in Scientific Library.)

UNITED STATES PATENT OFFICE
Certificate of Correction

Patent No. 2,895,825

July 21, 1959

Willibald Pelz et al.

It is hereby certified that error appears in the printed specification of the above numbered patent requiring correction and that the said Letters Patent should read as corrected below.

Column 8, lines 21 to 29 inclusive, the right-hand portion of Formula (F) should read as shown below instead of as in the patent:

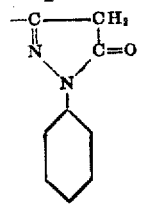

column 10, lines 48 to 53 inclusive, the structural formula should read as shown below instead of as in the patent:

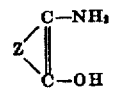

Signed and sealed this 3rd day of May 1960.

[SEAL]

Attest:
KARL H. AXLINE,
Attesting Officer.

ROBERT C. WATSON,
Commissioner of Patents.